United States Patent [19]

Balian et al.

[11] Patent Number: 4,824,727
[45] Date of Patent: Apr. 25, 1989

[54] CHAR-FORMING PROTECTIVE COATING FOR FLEXIBLE BASE MATERIALS

[75] Inventors: Charles Balian; Jon H. Simpson, both of Guilford; Arun Agarwal, Ansonia, all of Conn.

[73] Assignee: CHR Industries, Inc., New Haven, Conn.

[21] Appl. No.: 613,718

[22] Filed: May 24, 1984

[51] Int. Cl.$^4$ ............................................. C09J 7/02
[52] U.S. Cl. .................... 428/352; 428/355; 428/354; 428/921; 428/522
[58] Field of Search ............... 428/355, 352, 921, 354, 428/522

[56] References Cited

U.S. PATENT DOCUMENTS

| | | |
|---|---|---|
| 3,336,153 | 8/1967 | Juda . |
| 3,914,513 | 10/1975 | Brown et al. . |
| 4,061,826 | 12/1977 | Petras et al. . |
| 4,207,374 | 6/1980 | Groff .................................... 428/261 |
| 4,324,835 | 4/1982 | Keen ..................................... 428/921 |
| 4,372,997 | 2/1983 | Fritze et al. ........................... 428/921 |
| 4,463,465 | 8/1984 | Parker et al. ......................... 428/921 |

*Primary Examiner*—Edith Buffalow
*Attorney, Agent, or Firm*—Roylance, Abrams, Berdo & Goodman

[57] ABSTRACT

A catalytic coating is provided on a flexible backing such as a pressure sensitive adhesive tape. The tape comprises a thin, flexible film backing and is coated on one side thereof with a conventional or flame retardant pressure sensitive adhesive. The film is coated on the other side with the catalytic protective coating. The catalytic coating is very thin, i.e., less than 0.1 mil in thickness.

13 Claims, No Drawings

CHAR-FORMING PROTECTIVE COATING FOR FLEXIBLE BASE MATERIALS

BACKGROUND OF THE INVENTION

This invention relates to a char-protective coating for flexible base materials such as pressure sensitive adhesive tapes used to wrap and protect capacitors, coils and other electrical/electronic components in the event of a flaming environment.

Pressure sensitive adhesive tapes used to wrap and protect capacitors and coils are normally formed from thin polyester film backings and an acrylic or rubber/resin pressure sensitive adhesive to take advantage of the physical, chemical and electrical properties that such a composite affords. Thus, such composites are thin and flexible but strong, they afford good chemical and solvent resistance, they have good dielectric properties and they are non-corrosive. The problem with such polyester tapes, whether the pressure sensitive adhesive itself is formulated to be flame retardant or not, is that when subjected to flame, the polyester, which is the outermost surface and is thereby directly subjected to the flame, and/or pressure sensitive adhesive melts and drips usually as a flaming mass. If applied to a capacitor, the burning tape will melt and drip or burn away leaving the capacitor, which is by nature also composed largely of polyester film, exposed to the source of flame. The flaming drips can also ignite other parts of the electronic assembly containing the electrical component.

Flame retardant tapes are also known composed of inherently flame retardant backings such as Kapton, a trademark of DuPont, Telfon, also a trademark of DuPont, or fiberglass, such backings being coated with pressure sensitive adhesives. These tapes meet the requirements of UL 510 for flame retardancy and also meet the requirements of UL 1414 which is a test of an actual wrapped capacitor for flame retardancy. However, Kapton and Teflon are much more expensive than polyester film although such materials are now used on capacitors and coils to meet the standards of UL 1414. Fiberglass is also more expensive than polyester film and suffers from poor comformability when wrapping.

The flame retardant polyester tapes taught in U.S. Pat. No. 4,061,826 meet the requirements of UL 510 but do not meet the requirements of UL 1414 when tested on an actual capacitor because the polyester melts and drips, forming flaming drips and burns away exposing the polyester-foil inner wrappings of the capacitor.

It is an object of this invention to provide a means of making conformable, low cost commonly used film, such as polyester, flame retardant so that it will not only pass the requirements of UL 510, but more importantly, the requirements of UL 1414 where the actual component is tested.

It is a further object of the present invention to make a tape that will not melt or drip away from the electrical/electronic component it was designed to protect when exposed to flame.

It is another object of this invention to make a tape that will continue to protect the electrical/electronic component even though burned in a flame.

SUMMARY OF THE INVENTION

The objects of this invention are attained by providing a char-forming protective coating on a flexible base material. The base material or backing may be a polyester, cellulose acetate, a non-woven polyester mat, the polyester being either saturated or ethylenically unsaturated, or any other polymer that melts and drips in flame. The base material is coated on one side with the char-forming protective coating of this invention. The char-forming protective coating is very thin, i.e., less than 0.1 mil in thickness, and preferably less than 0.05 mil in thickness. Since the char-forming protective coating is so thin, the inherent flexibility of the flexible base material is maintained. When the coated base material is exposed to flame, the protective coating promotes the formation of a strong carbonaceous char and, thereby, prevents melting or dripping. The physical state of the char after being formed is a hard, friable, foam-like mass that no longer melts or drips in flame. It is self-supporting but may be crushed to a fine dust when cool. At least some of the base material becomes part of the char. The amount of char formed is far more than might be expected by the amount of coating deposited. The coating is believed to act catalytically to promote the development of a strong char from the reaction products of combustion of the base material.

DETAILED DESCRIPTION OF THE INVENTION

The invention will be more specifically described with particular reference to a pressure sensitive adhesive tape. Such a tape comprises a thin, flexible polymer, e.g., a polyester film backing, and is coated on one side with a conventional pressure sensitive adhesive which may or may not be formulated to be flame retardant. The polyester film is coated on the other side with the char-forming protective coating of this invention. The pressure sensitive adhesives which may be used to coat one side of the film backing are well known in the art. Examples of such materials are disclosed in U.S. Pat. No. 4,061,826, the disclosure of which is incorporated herein by reference.

Combustion of a polymeric material in a flaming environment involves the pyrolytic degradation and decomposition of the polymer into lower molecular weight and volatile by-products. Depending on the amount of energy available (heat) and the particular polymer involved, the degradation can be rapid or slow, partial (random scission) or complete (unzip to monomer). Vapor phase oxidation of the volatile by-products generates more heat and thus propagates the combustion reactions. Thus, polystyrene quickly decomposes in a flame, unzipping into monomeric volatile styrene fragments that burn (oxidize) readily liberating more heat and thus propagating the combustion. Polyethylene terephthalate (polyester) decomposes more slowly through a random scission process, but passes through a stage that melts easily at the flaming temperature.

This invention utilizes polyfunctional reactive molecules, groups, or compounds to react with and/or catalyze the cyclization and cross linking of the non-volatile but reactive (free radical) fragments of the combustion process. Catalysis is believed to progress through a chain transfer mechanism. The cross-linking process converts the fusible polymer system into an intractible, non-melting solid (carbonaceous char) that serves to occlude air from the combustion zone and essentially quenches the volatilization process once formed. Halogenated flame retardant compounds (such as vinylidene chloride) serve to facilitate char formation by lowering the combustion zone temperature thereby favoring cross-linking in deference to decomposition reactions. Examples of polyfunctional moieties include the following:

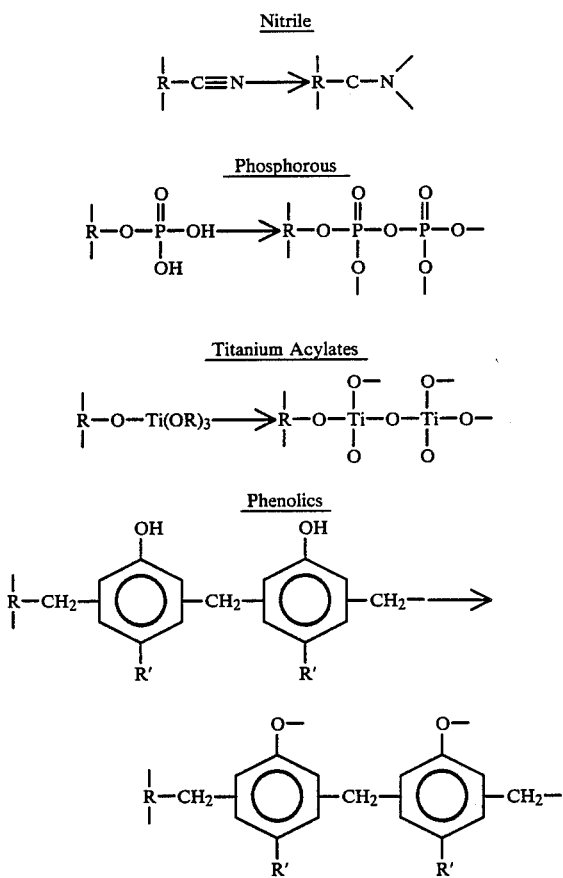

Also shown are the cross-linked groups that are formed when these polyfunctional moieties are exposed to flame resulting in charring.

The char-forming protective coating of this invention may be applied to one side of the film backing as a solution in a volatile solvent. The char-forming material is any material which acts catalytically to promote the formation of a char from the combustion products of the burning tape. Several such catalysts may be incorporated. These include nitrile/halogen materials such as Saran F-310, nitrile/reactive phenolics such as 3M 776, nitrogen/phosphorous materials, phosphorous/halogen materials and reactive compounds such as anhydrides, epoxies and titanium acylates. The char-forming materials may be used alone or in combination with other such materials. The char-forming protective coating may comprise less than 10%, and preferably comprises from 3-5%, of the thickness of the film backing. In a preferred embodiment, the protective coating is modified to include a functional release agent so that when the tape is rolled up, the pressure sensitive adhesive will not adhere tightly to the side containing the char-forming protective coating with which it is in contact. Such release agents include RC500 (an acrylonitrile copolymer), Escoat p-20 (polyvinyloctadecylcarbamate), and Syl-Off 23 (polydimethylsiloxane). The release agent may be used in amounts up to 50% of the coating solids and preferably comprises from 10-20% of the coating solids.

When exposed to flame, the char which forms burns with difficulty and continues to protect the electrical component, e.g., a capacitor, while in the flame. The coating fosters a non-drip, char-forming protection whether the tape as a whole is classified as flame retardant or not. In fact, a flame retardant tape made as described in U.S. Pat. No. 4,061,826 but without the protective coating of this invention, does not char but melts and drips continuously when placed in a flame. However, a standard pressure sensitive adhesive tape that is not formulated to be flame retardant, by the use of the coating of the invention, chars when placed in a flame with no flaming drips.

The following examples illustrate the practice of this invention.

EXAMPLE 1

A 20% solution of acrylonitrile-vinylidene chloride copolymer (Saran F-310) was prepared by dissolving the resin in methyl ethyl ketone (MEK) with gentle agitation. This solution was designated component I. A 5% solution of Epon 1004, used as an anchoring aid, was similarly prepared in MEK. This solution was designated component II. A 5% solution of acrylic-acrylonitrile release copolymer was prepared in toluene by dissolving 20 parts of RC500 (25% solution) in 80 parts of toluene. This solution was designated component III. The final coating solution was prepared by mixing equal parts of components I, II and III to give a final solution solids content of 10% composed of Saran F-310:Epon 1004:RC500 at a 4:1:1 ratio.

EXAMPLE 2

A solution of high acrylonitrile-butadiene copolymer and heat reactive phenolic resin was prepared at 8% solids in MEK. This coating is available commercially at 24% solids solution as 3M 776 Fuel Resistant Coating and is diluted to 8% by blending 1 part of 3M 776 to 2 parts of MEK. This solution was designated component IV. A 1.3% solution of acrylic-acrylonitrile release polymer in toluene was prepared by dissolving 8 parts of RC500 (25% solution) in 142 parts of toluene. This solution was designated component V. The final coating solution was prepared by mixing equal parts of components IV and V to give a final coating solids content of 4.7% composed of 3M 776:RC500 at a 6:1 ratio.

Four pressure sensitive adhesive tapes were made as follows:

For Tape A, the coating solution of Example 1 was used as a protective release coat to make a polyester pressure sensitive adhesive tape using a flame retardant acrylic pressure sensitive adhesive. The manufacturing procedure involved applying the release coat on the backside of a 1 mil polyester film backing by means of an applicator roll and doctoring off the excess with a Meyer Rod to give a dry deposition of 3 grams/yd$^2$ (0.08 mil thickness). The coating was dried in a warm circulating air oven before the film was brought to the next station. At the second station, a standard pigmented flame retardant acrylic adhesive was applied to the side opposite the release coating by means of a reverse roll coater to give a dry deposition of 1.5 mils of adhesive. The applied adhesive coating was dried and cured in a circulating air oven, then wound onto itself to make Tape A.

Tape B was made using the same polyester film and the same flame retardant acrylic adhesive as used in making Tape A but with a standard acrylic based release coat, i.e., not in accordance with this invention.

Tape C was made using the same polyester film and the same flame retardant acrylic adhesive as used in making Tape A. However, the release coat of Example 1 was substituted with the release coat of Example 2 which was applied at a dry coating weight of 1 gm/yd$^2$ (0.03 mil).

Tape D was made the same as Tape C utilizing the release coat of Example 2 but substituting a pigmented acrylic pressure sensitive adhesive that was not compounded to be flame retardant for the flame retardant acrylic adhesive used to make Tape C.

Each of Tapes A, B, C and D were tested for flaming drips as follows:

A 1 inch strip of the test tape was folded back on itself four times to form a square inch four layers thick. The sample was held at one corner by tongs and ignited with a bunsen burner and the number of molten drops counted. As shown in the following table, Tapes A, C and D did not drip while Tape B dripped 20 times before being consumed by flame. Furthermore, the charred remains of Tapes A, C and D were strong and firm and did not burn after being formed.

| TABLE OF PROPERTIES (1 mil Polyester Film PSA Tapes) | | | | |
| --- | --- | --- | --- | --- |
| | TAPE A | TAPE B | TAPE C | TAPE D |
| Release Coat | Example 1 | Standard | Example 2 | Example 2 |
| Acrylic Adhesive | Flame Retardant | Flame Retardant | Flame Retardant | Standard (non-flame retardant) |
| Adhesion (oz/in) | 29–31 | 29–31 | 29–31 | 29–31 |
| Flaming Drips | 0 | 20 | 0 | 0 |

What is claimed is:

1. A char-forming flexible base material consisting essentially of (1) a flexible backing of film, fiber and/or non-woven mat, said backing being comprised of a polymer that melts and drips in flame forming free radical fragments, and (2) a very thin catalytic coating applied to at least one side of said backing, said coating comprising a compound or compounds containing at least one polyfunctional moiety selected from the group consisting of atoms, molecules, and radicals having a valence functionality of at least 3, said polyfunctional moieties being capable of reacting with and/or catalyzing the cyclization and crosslinking of said free radical fragments and promoting the formation of a strong char from the combustion products of the base material, said char being strong enough to prevent the melting and dripping of the base material when exposed to a flaming environment said coating being present in a thickness insufficient to form a char by itself.

2. A char-forming pressure sensitive adhesive tape comprised of (1) a flexible backing of film, fiber and/or non-woven mat, said backing being comprised of a polymer that melts and drips in flame, (2) a pressure sensitive adhesive coated on one side, and (3) a very thin catalytic coating of claim 1 coated on the other side, wherein said catalytic coating acts catalytically in a flame to promote the formation of a strong char from the combustion products of the backing and adhesive, said char being strong enough to prevent the melting and dripping of the tape backing and adhesive when exposed to a flaming environment.

3. A char-forming pressure sensitive adhesive tape of claim 2 comprised of (1) a flexible polyester film backing, (2) a conventional acrylic pressure sensitive adhesive coated on one side, and (3) a very thin catalytic coating coated on the other side wherein said catalytic coating acts catalytically to promote a strong char in a flame from the combustion products of the polyester film and acrylic adhesive, said char being strong enough to prevent the melting and dripping of the polyester film and acrylic adhesive when exposed to a flaming environment.

4. A char-forming pressure sensitive adhesive tape of claim 3 wherein the acrylic adhesive is formulated to be flame retardant.

5. A char-forming pressure sensitive adhesive tape of claim 3, wherein the catalytic coating also contains a release agent in an amount up to 50% of the coating solids.

6. A char-forming pressure sensitive adhesive tape of claim 3 wherein the catalytic coating is applied as a very thin coating of less than 10% of the thickness of the film backing.

7. A char-forming pressure sensitive adhesive tape of claim 2 comprised of (1) a flexible polyester film backing, (2) an acrylic pressure sensitive adhesive formulated to be flame retardant coated on one side and (3) a very thin catalytic coating coated on the other side, said catalytic coating also containing a release agent of up to 50% of the catalytic coating solids in order to improve self wound characteristics of the pressure sensitive tape, said catalytic coating containing the release agent applied as a very thin coating of less than 10% of the thickness of the backing in order to maintain the inherent flexibility of the polyester film backing.

8. A char-forming flexible base material of claim 1 wherein the catalytic coating includes an acrylonitrile/vinylidene chloride copolymer.

9. A char-forming flexible base material of claim 1 wherein the catalytic coating includes a butadiene/acrylonitrile copolymer and a heat reactive phenolic resin.

10. A char-forming pressure sensitive adhesive tape of claim 2 wherein the catalytic coating includes an acrylonitrile/vinylidene chloride copolymer.

11. A char-forming pressure sensitive adhesive tape of claim 2 wherein the catalytic coating includes a butadiene/acrylonitrile copolymer and a heat reactive phenolic resin.

12. A method for imparting char-forming properties to a flexible polymeric base material which melts and drips in flame, consisting essentially of applying a very thin catalytic coating, wherein said catalytic coating acts catalytically in a flame to promote the formation of a strong char from the combustion products of the base material, said char being strong enough to prevent the melting and dripping of the base material when exposed to a flaming environment.

13. The method of claim 12, wherein said base material is a pressure sensitive adhesive tape.

* * * * *